United States Patent
Ketel et al.

(10) Patent No.: US 6,511,410 B1
(45) Date of Patent: Jan. 28, 2003

(54) APPARATUS FOR PRODUCING PACKETS

(75) Inventors: Ronald Herman Ketel, Vlaardingen (NL); Kevin John Stamp, Wirral (GB)

(73) Assignee: Lipton, division of Conopco, Inc., Englewood Cliffs, NJ (US)

( * ) Notice: Subject to any disclaimer, the term of this patent is extended or adjusted under 35 U.S.C. 154(b) by 40 days.

(21) Appl. No.: 09/615,510

(22) Filed: Jul. 13, 2000

(30) Foreign Application Priority Data

Jul. 14, 1999 (EP) .............................................. 99305580

(51) Int. Cl.$^7$ ................................................ B31B 1/02
(52) U.S. Cl. ........................ 493/961; 493/375; 493/376
(58) Field of Search .............................. 53/413, 134.2; 493/375, 376, 591

(56) References Cited

U.S. PATENT DOCUMENTS

| | | | |
|---|---|---|---|
| 2,556,383 A | * 6/1951 | Williams | 493/351 |
| 3,564,983 A | * 2/1971 | Grim et al. | 493/323 |
| 3,599,387 A | 8/1971 | James | |
| 4,288,224 A | * 9/1981 | Romagnoli | 493/345 |
| 5,135,762 A | * 8/1992 | Vernon et al. | 426/79 |
| 5,584,205 A | * 12/1996 | Harsch et al. | 72/405.02 |
| 5,632,132 A | * 5/1997 | Kuipers et al. | 426/79 |
| 5,651,235 A | * 7/1997 | Ashley et al. | 53/458 |
| 5,689,936 A | * 11/1997 | Kenney | 53/134.2 |
| 5,747,718 A | * 5/1998 | Bill et al. | 86/23 |
| 5,842,370 A | * 12/1998 | Hofele et al. | 198/621.1 |
| 5,878,550 A | * 3/1999 | Cahill et al. | 53/134.2 |
| 5,893,256 A | * 4/1999 | Ghirlandi | 53/134.2 |
| 5,979,144 A | * 11/1999 | Bailey et al. | 53/134.2 |
| 6,212,855 B1 | * 4/2001 | Yasunaga et al. | 53/119 |
| 6,314,786 B1 | * 11/2001 | Hofele et al. | 198/621.1 |

FOREIGN PATENT DOCUMENTS

| | | |
|---|---|---|
| DE | 1022960 | 1/1958 |
| DE | 2005821 | 11/1970 |
| EP | 0 135 892 | 3/1985 |
| WO | WO 95/10462 | 4/1995 |
| WO | WO 9510462 A1 * | 4/1995 |
| WO | WO 99/21762 | 5/1999 |
| WO | WO 9921762 A1 * | 5/1999 |

* cited by examiner

Primary Examiner—Rinaldi I. Rada
Assistant Examiner—Gloria R Weeks

(57) ABSTRACT

An apparatus for attaching a tag and a thread length to a web of filter material with one end of the thread length secured to the tag and the other end being secured to the web adjacent one side edge of the web and the tag being attached to the web adjacent the opposite side edge. The apparatus has a gripper for drawing the tag, with the thread secured thereto, across the web from that one edge to an extended position beyond the opposite side edge before returning the tag to a final extended position over the web. The apparatus also has a mechanism for attaching the tag to the web in the final position, a displacement mechanism for the gripper means that has a first linear guide on which the gripper is slidable, and a second inner guide that is transverse to the first guide and fixedly located in the apparatus. The gripper is movable in the mutually transverse directions of the guides, both transversely across the web to the extended and final positions and longitudinally of the web away from the tag-attaching mechanism.

8 Claims, 8 Drawing Sheets

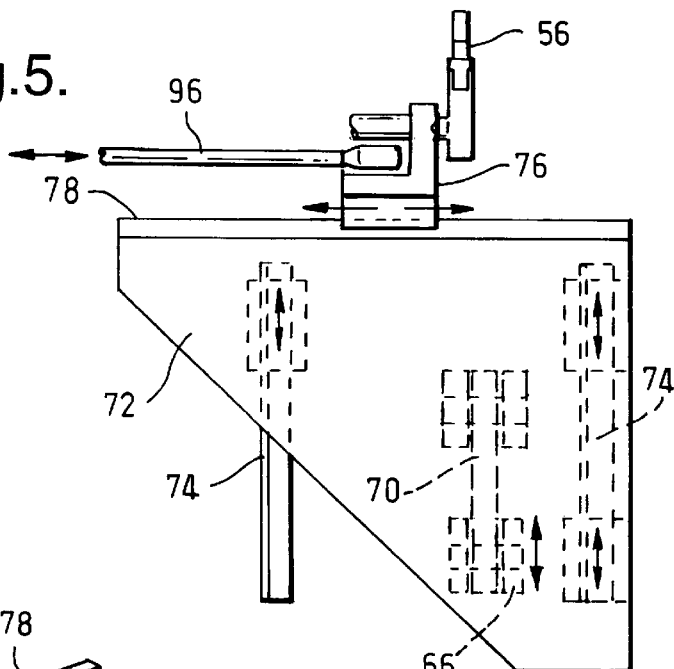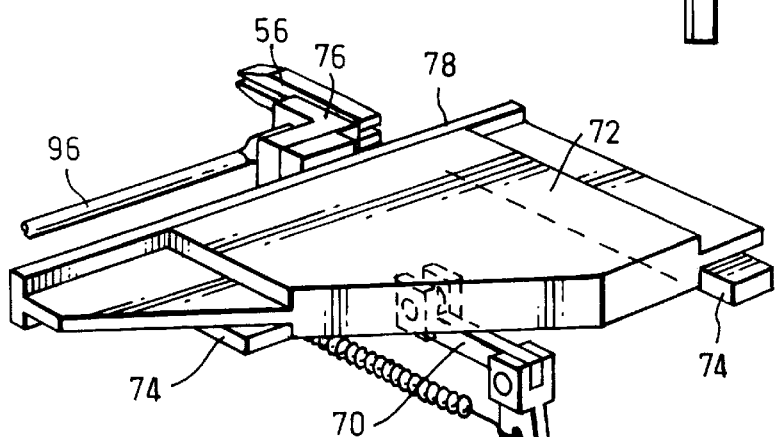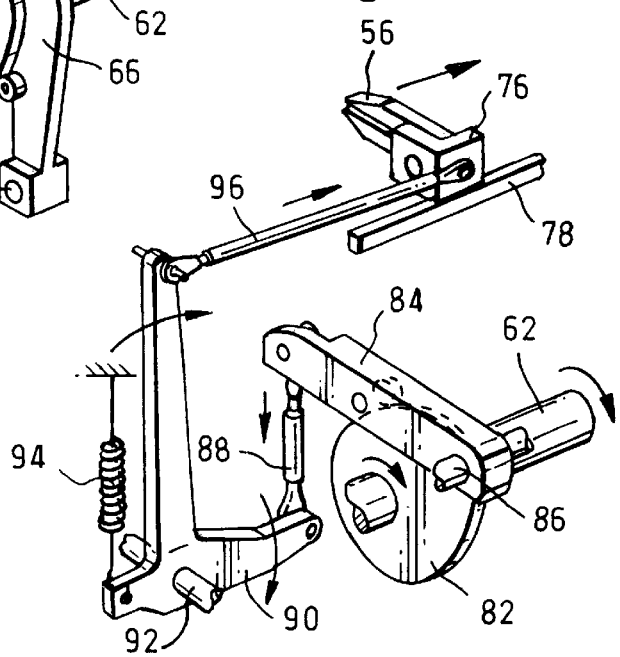

Figure 1:
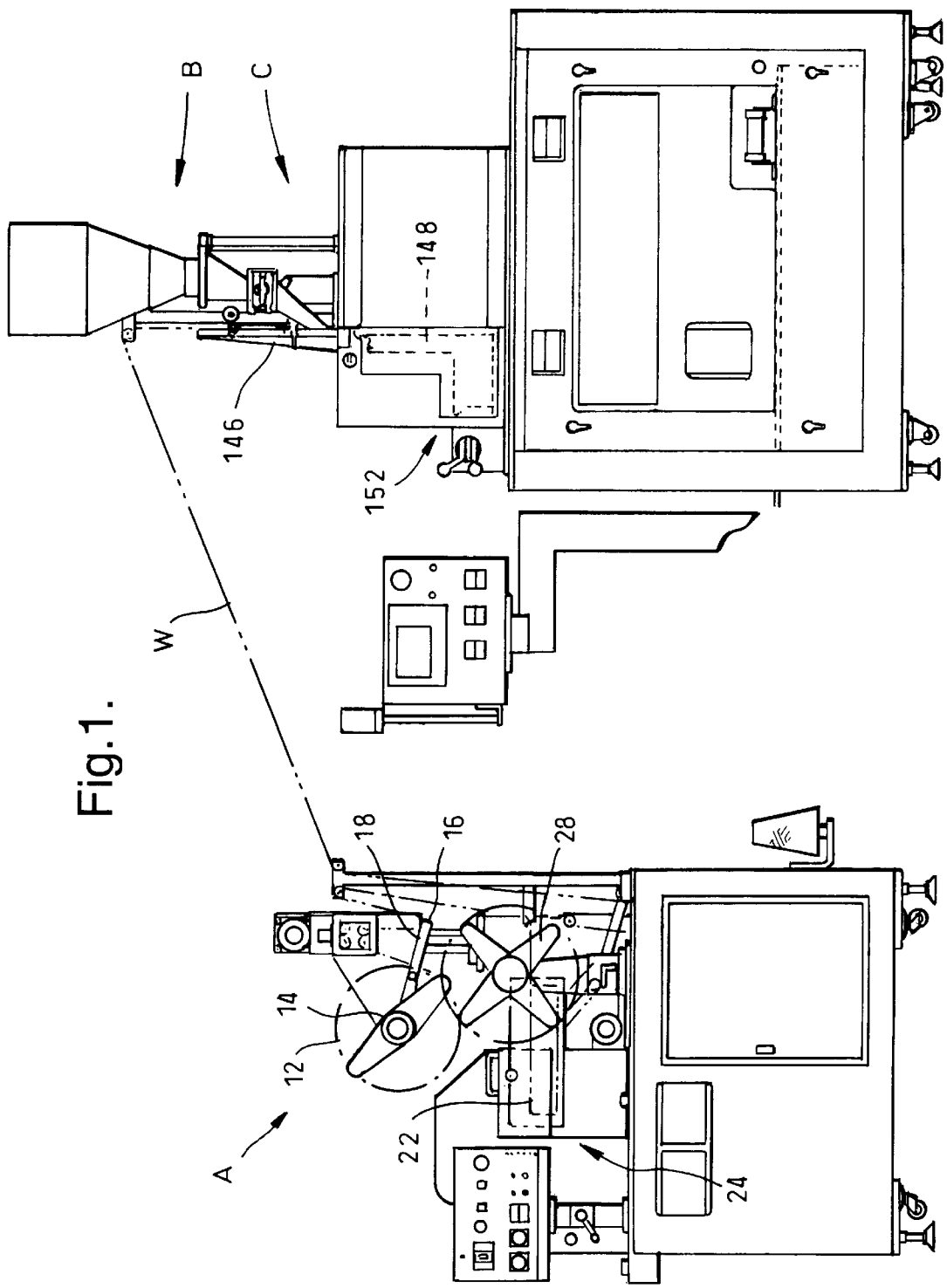

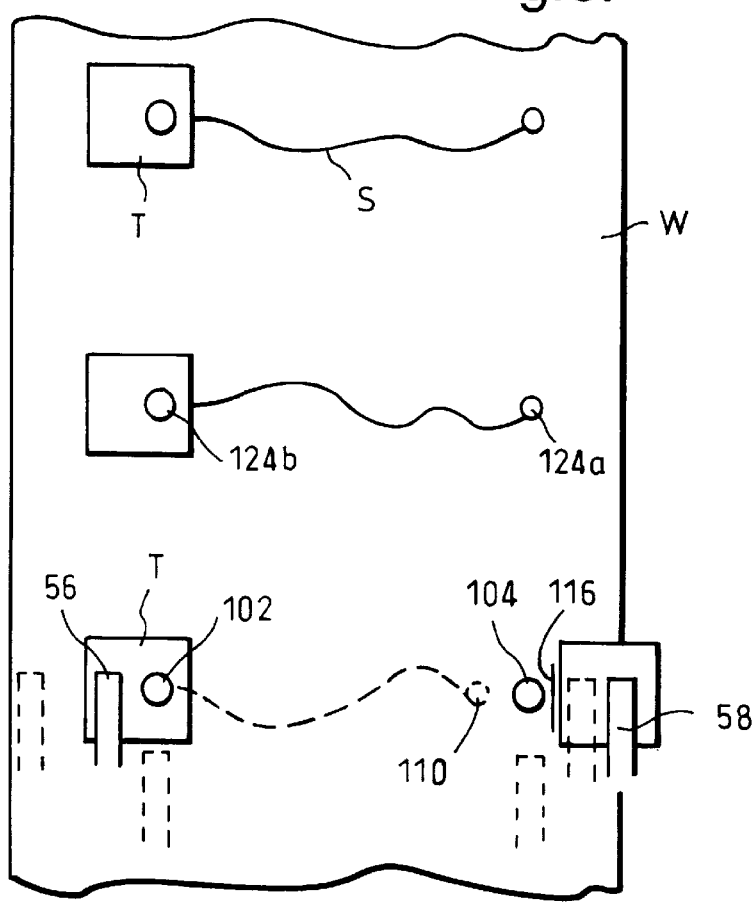
Fig.8.
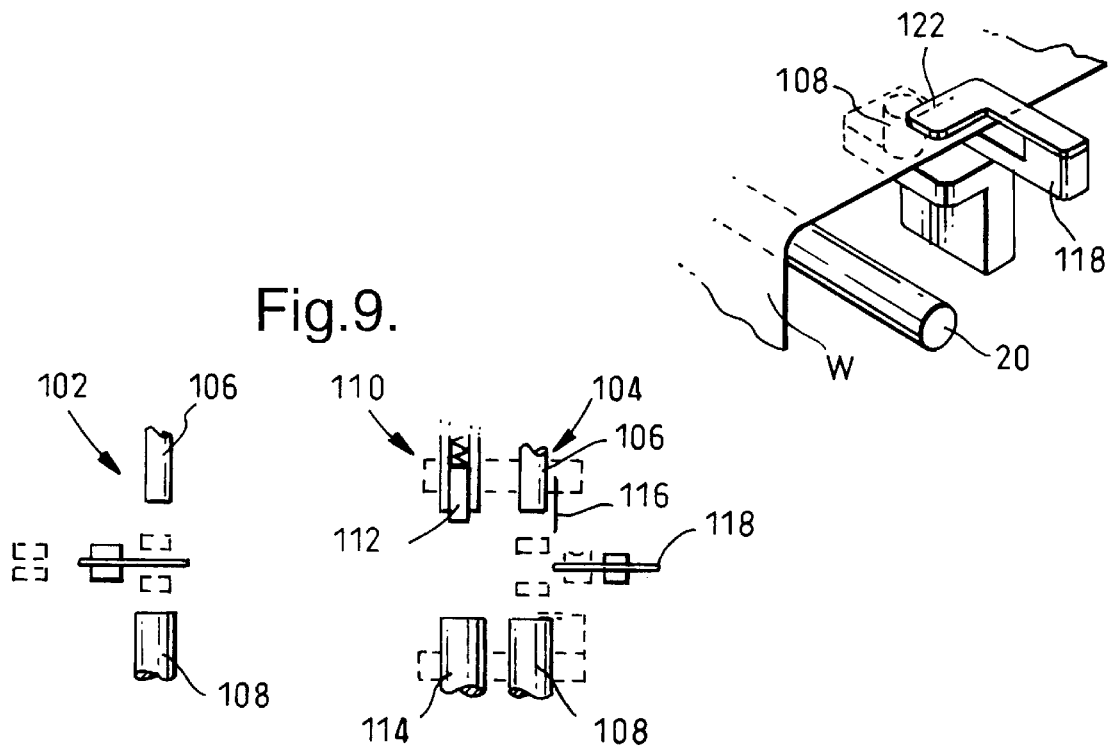
Fig.8a.
Fig.9.

APPARATUS FOR PRODUCING PACKETS

This invention relates to apparatus for the production of tagged packets, such as infusion bags, in which a tag and thread length is attached to the bag envelope of filter material to allow the bag to be suspended from the tag in use.

When producing such tagged packets it is generally undesirable to allow the tag to hang free from the bag by its thread because when a number of such packets are packaged together the threads can easily become entangled. Generally, therefore, the tag is temporarily attached to the bag in addition to securing the end of the thread remote from the tag permanently to the bag.

A simple way of placing the thread is lay it across the filter material while it is still a flat web, attaching the tag near one side edge and securing the opposite end of the thread near the other side edge. In this arrangement, however, the width of the web determines the length of the thread and that length may be undesirably limited. In order to provide an ample length of thread it is known to give the thread a convoluted pattern on the web, but the mechanisms to produce such patterns are relatively complicated.

It is also known to increase the length of the thread by drawing a tag attached to one end of the thread across the web to an extended position beyond the side edge of the web, thus returning to tag to a final position over the web near that side edge to attach it to the web. Although the additional length is obtained by a simple rectilinear movement, if it is required to attach the tag to the web on or near the line of the thread, it is necessary to ensure that the tag drawing means does not clash with the tag-web attaching means.

According to one aspect of the present invention, apparatus is provided for attaching a tag and length of thread length to a web of filter material, one end of the thread being secured to the tag and the other end being secured to the web adjacent one side edge, and the tag being attached to the web adjacent the opposite side edge, the apparatus comprising gripper means for drawing the tag beyond said opposite side edge before returning the tag to a final extended position over the web, and means for attachment of the tag to the web in said final position, a displacement mechanism for said gripper means comprising a first linear guide on which the gripper means is slidable, and a second linear guide transverse to said first guide on which said first guide is slidable, said second guide being fixedly located in the apparatus, whereby the gripper means is movable in the mutually transverse directions of the guides, both transversely across the web to said extended and final positions and longitudinally of the web away from the tag-attaching means.

In this manner a relatively simple and robust mechanism can be provided that will lay the extended length of thread across the web and also begin the return movement of the gripper means past the tag-attaching means by guiding the gripper means longitudinally of the web to clear the attaching means.

Preferably, said first linear guide extends transversely across the web and said second linear guide on which the first guide is slidable extends longitudinally of the web.

The use of the form-fill process for producing filled packets is well known, the packet filter material in the form of a continuous web being shaped into a tube around a forming tube through which the filling material is provided and, as it is drawn off the tube, transverse seals being made to form it into separate compartments which are separated to yield the individual packets. It is also known to make the transverse seals and separate the packets by traversing an ultrasonic sealing device across the flattened tubular web and back.

According to a further aspect of the present invention, the sealing and separating process is accelerated without incurring any significant additional costs by performing the cutting and sealing operation over the width of the tubular web in a single pass whereby successive packets are sealed closed and separated by displacements of the ultrasonic sealing device in opposite directions.

The sealing device can be located on a rotary mounting that pivots coaxially to the forming tube to perform successive cutting and sealing operations in mutually transverse directions, so producing tetrahedral-like packets.

Figure 2:
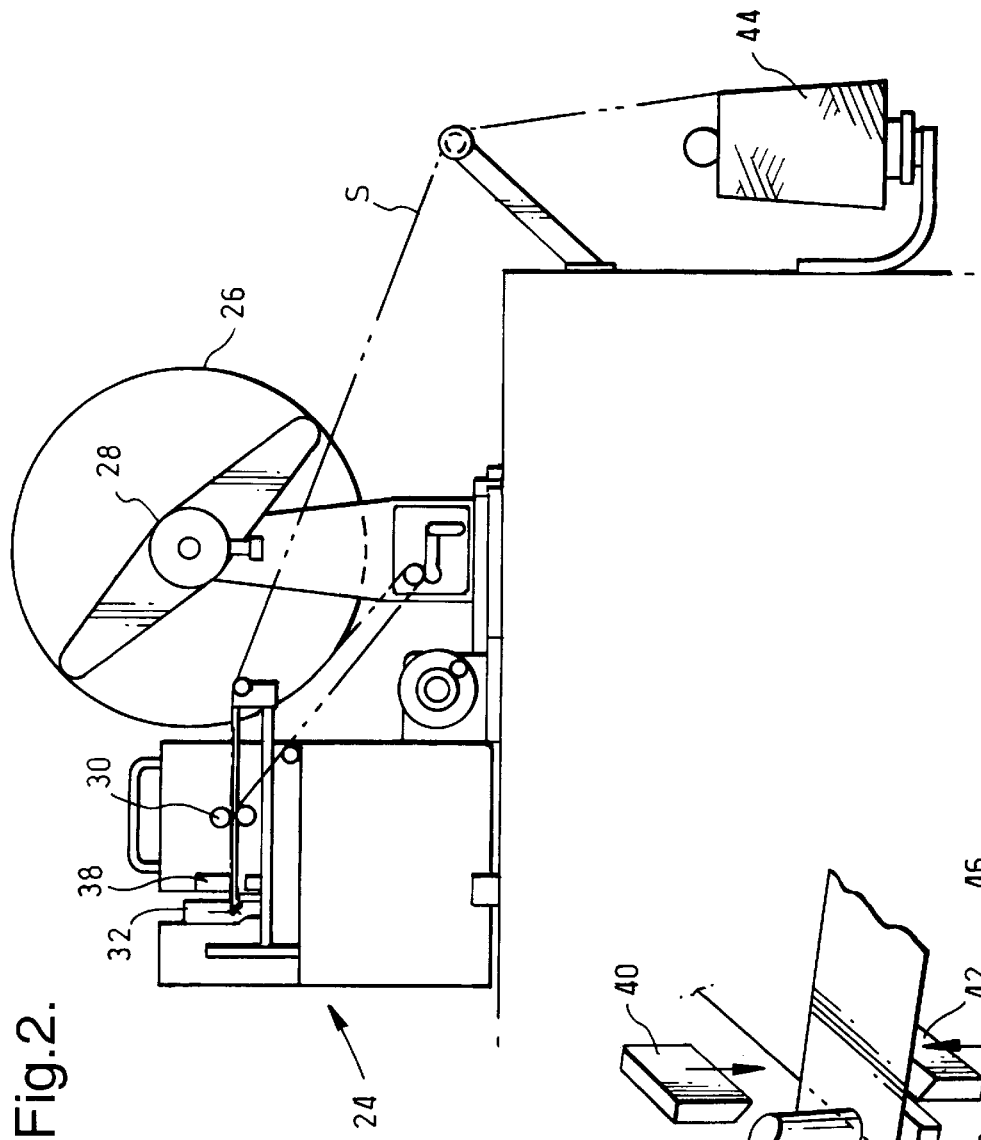
Figure 2A:
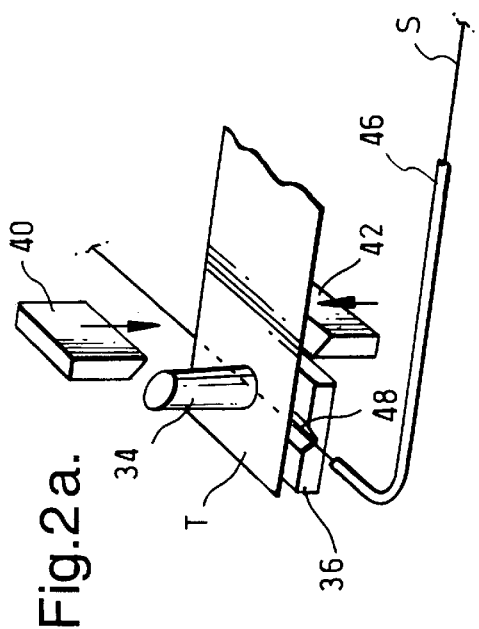
Figure 3A:
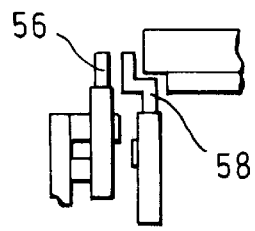
Figure 3:
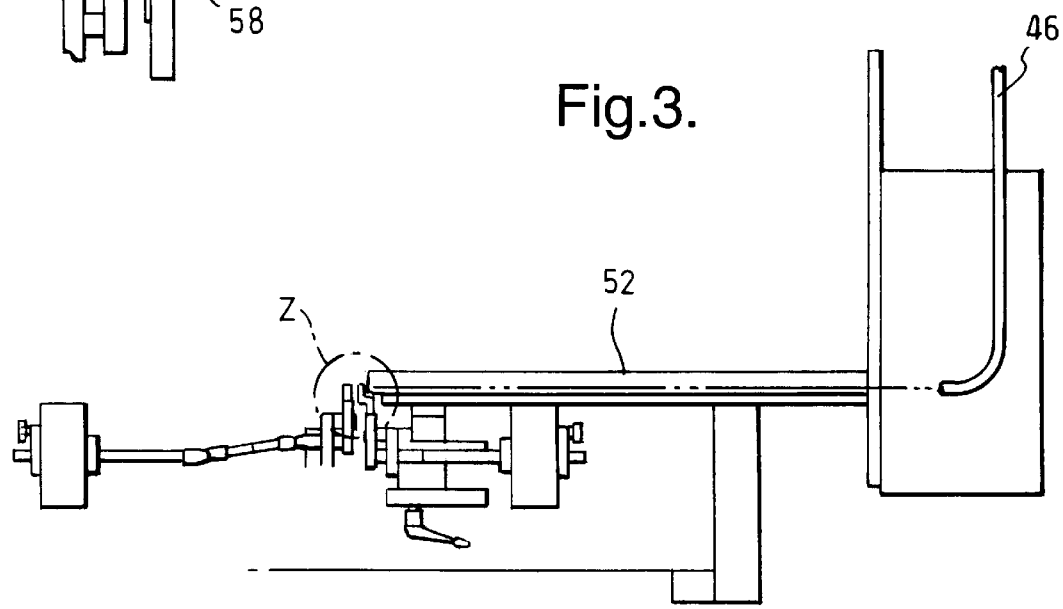
Figure 4:
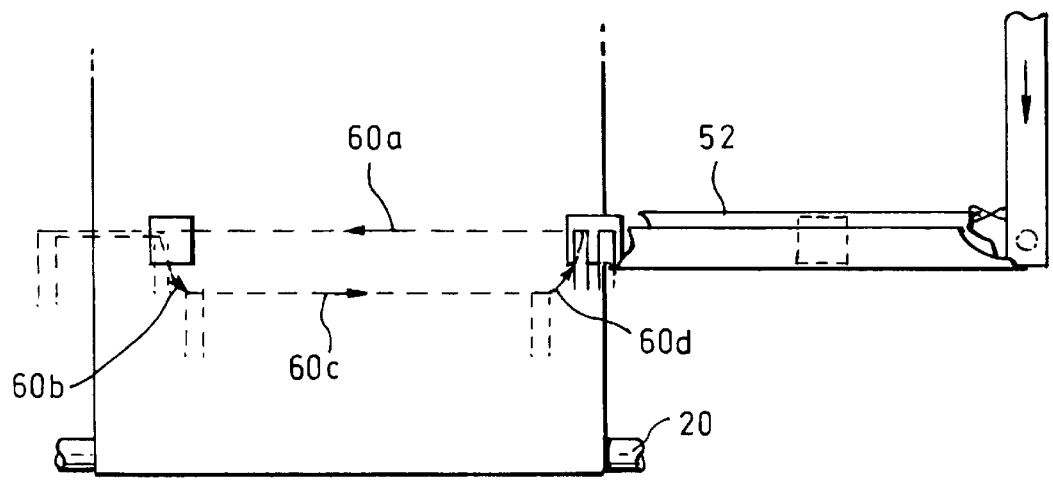
Figure 10:
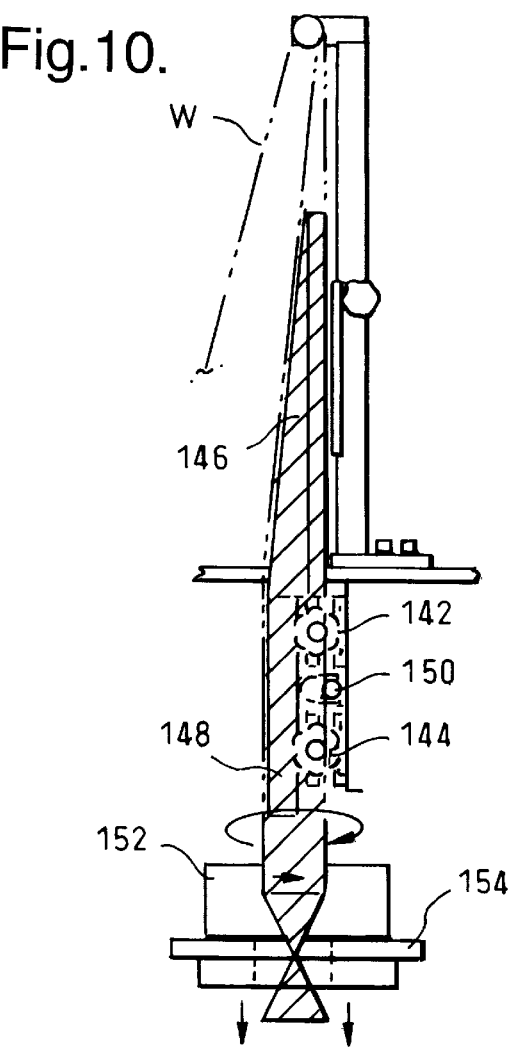
Figure 13:
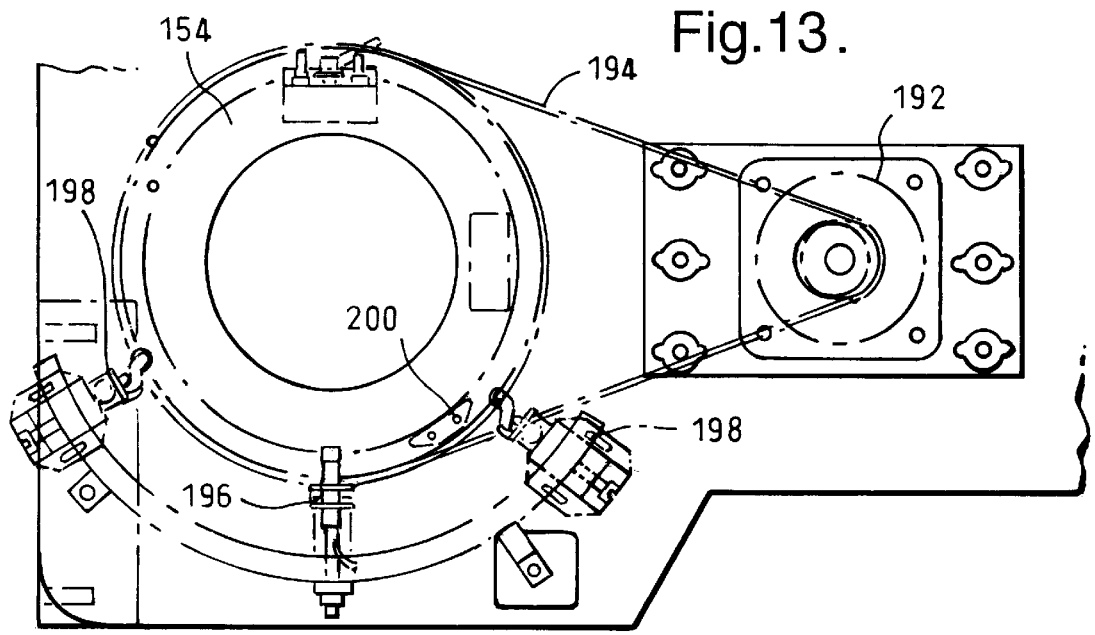
Figure 11:
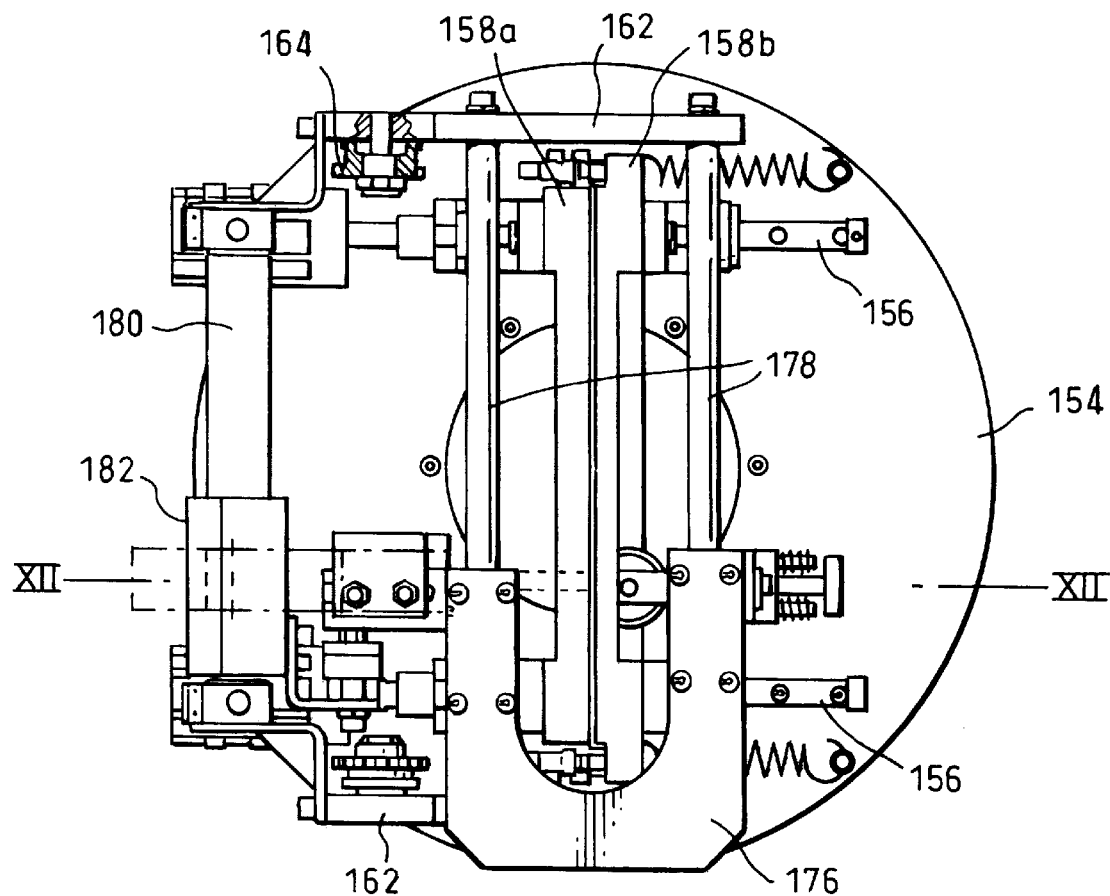
Figure 12:
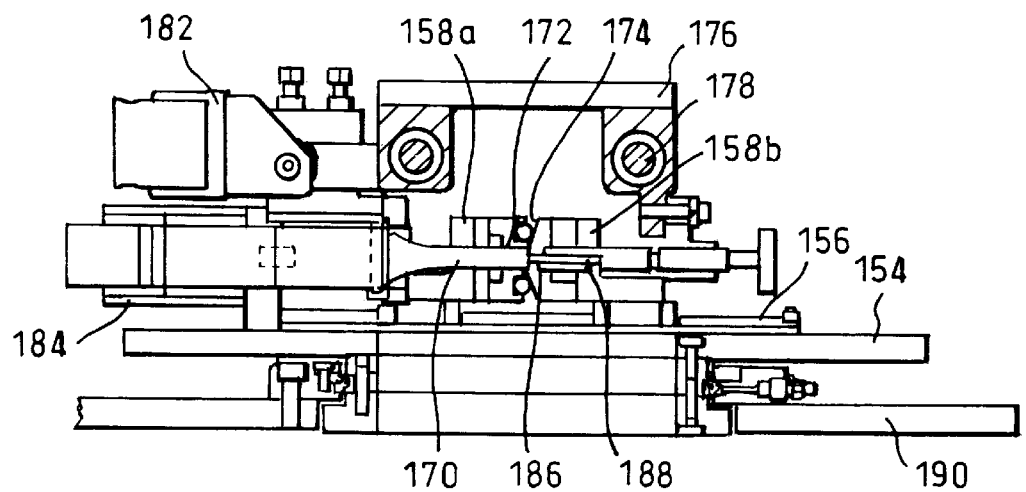
Figure 14:
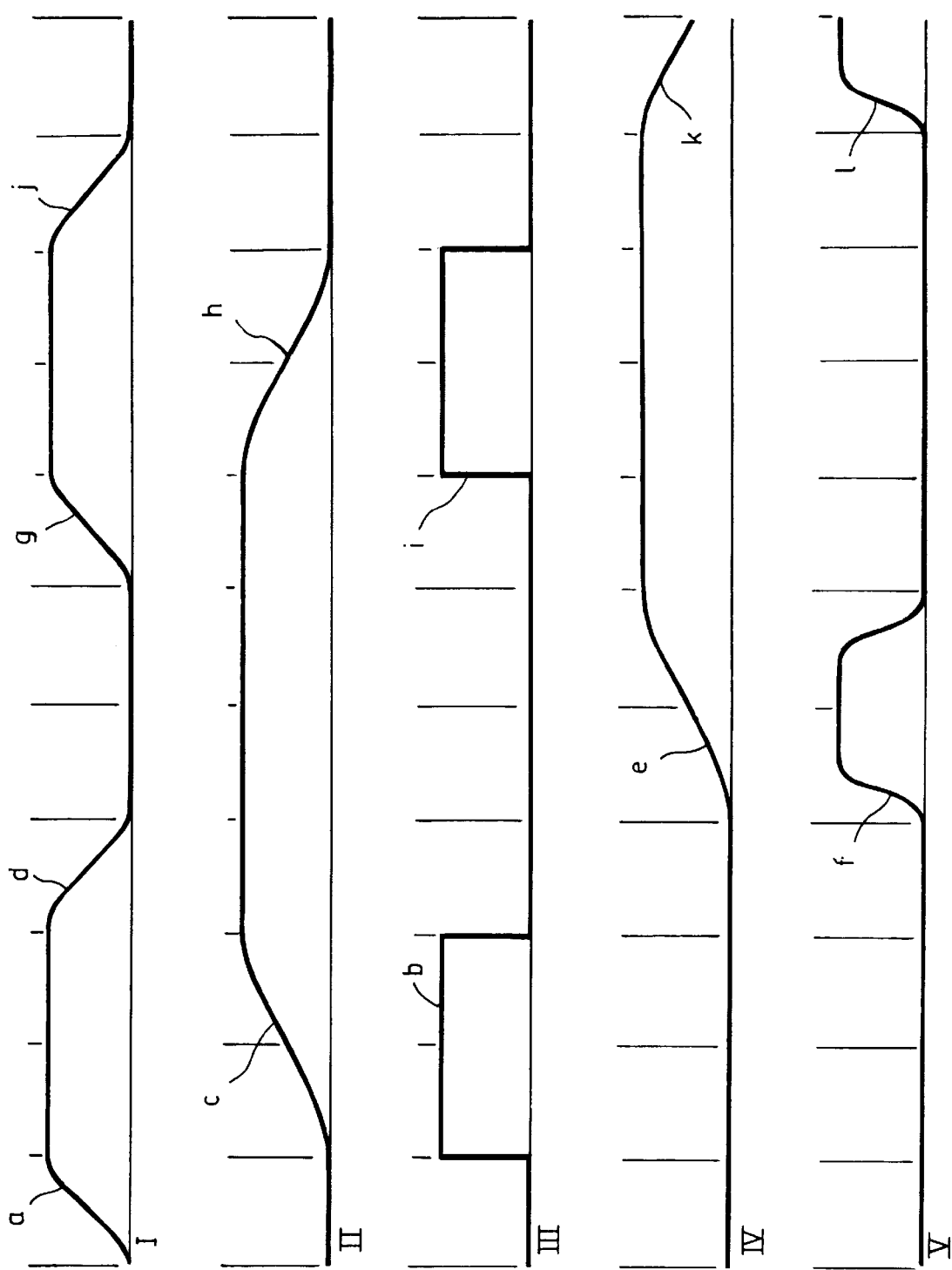

By way of example, an embodiment of the invention will now be described with reference to the accompanying diagrammatic drawings, in which:

FIG. 1 is a side view of a machine for producing tagged tea bags which incorporates the invention, FIG. 2 is a side view to a larger scale of the tag-thread unit of the machine in FIG. 1 showing the tag and thread supply means, FIG. 2a shows schematically the tag to thread attachment process, FIG. 3 is a plan view of the tag path to the filter web in the tag-thread unit, FIG. 3a is an enlarged detail of the circled area Z in FIG. 3, FIG. 4 is a plan view further illustrating the tag path over the web in the tag-thread unit, FIG. 5 is a plan view of the mechanism carrying the leading gripper for drawing the tag over the filter web, FIGS. 6 and 7 show the cam drives for the gripper mechanism in FIG. 5, for movement longitudinally and transverse to the web respectively, FIGS. 8 and 9 illustrate in plan and from the front respectively, the ultrasonic sealing devices for attaching a tag-thread assembly to the web, FIG. 8a is a detail illustration of thread cutting device on the thread sealing device, FIG. 10 illustrates schematically the packet forming process in the inner bag unit of the machine, FIGS. 11 and 12 are plan view and a side sectional view on the line XII—XII of the web transverse cutting and sealing mechanism, FIG. 13 is a plan view of the rotary drive for the cutting and sealing unit, and FIG. 14 is a graphical illustration of the sealing and cutting operations in the inner bag unit.

FIG. 1 is an overall view of the bag-forming machine. It has three main units. Firstly, a tag-thread unit A where tags are attached at spaced positions along a thread and each tag is then attached with a length of the thread to a web of filter material from which the bags are to be formed. The web leaves the tag-thread unit with a series of separate tag-thread assemblies applied across it at spaced intervals along its length (as indicated in FIG. 8), and is led to an inner bag unit B which comprises a form-fill apparatus in which the web is first formed into a tube and the tube is then sealed transversely to give a series of discrete compartments which are separated into the individual bags. The third main unit is a dosing unit C above the bag unit which supplies doses of tea or other filling material to the form-fill apparatus to be deposited in the filter tube before each compartment is sealed closed. The filter web W, of a porous plastic material capable of being sealed ultrasonically, is supplied from a reel 12 mounted in a holder 14 in the tag-thread unit A. The web path is shown leading over a roller 16 on a tensioning arm 18 and subsequently over a rear roller 20 (FIG. 4) to a horizontal track region 22 in the unit where the tag-thread assemblies are applied to the web, before it passes over the exit rollers to the inner bag unit B.

A tag-thread attachment module 24 in the unit A is offset laterally from the web path. Tags T are supplied to in a continuous strip from a reel 26 mounted on a holder 28, as shown to a larger scale in FIG. 2. The tag strip is drawn from the reel to the module by a pair of pinch rollers 30 in a stepped feed. With each step, one tag length of the strip is located in an ultrasonic sealing device 32, to be gripped between a horn 34 and anvil 36 of the sealing device. In the path of the tag strip, immediately upstream of the sealing device 32 is a cutter 38 comprising cooperating upper and lower shear blades 40,42. The thread S is drawn from a spool 44, through a thread guide 46 to the sealing device 32 where it is guided laterally into a groove 48 in the sealing device anvil 36 to lie across the foremost tag length of the tag strip in the sealing device.

In operation, when the leading tag of the tag strip has been located in the sealing device 32, over the thread in the anvil groove 48, the horn 34 and anvil 36 of sealing device are closed together to grip the tag and thread, and the horn is energised to secure them to each other. Immediately this has occurred, the cutter 38 is operated to sever the tag from the tag strip.

In a manner described in more detail below, the tag, with the attached thread, is drawn from the attachment module 24, transversely to the plane of FIG. 2, in two steps. In the first step the tag at the sealing device is drawn along a tag chute 52 (FIGS. 3 and 4) to the end of the chute at the right-hand edge of the web as shown in FIG. 4 for example. In the second step, also shown in FIG. 4, the tag is drawn across the filter web, while the thread remains in a continuous length extending from the spool 44, to an extended left-most position. These movements are obtained by gripping the foremost tag with a leading gripper 56 that is displaceable across the width of the web. Between the two successive steps, a further tag is secured to the thread in the attachment module 24 by the sealing device 32 in the manner already described. As each tag is brought to an extended position beyond the width of the web, the following tag thus emerges from the tag chute and is held by a retaining gripper 58 before being engaged by the leading gripper in its next cycle of movement.

FIG. 4 illustrates these displacements of the tag transversely to the web. The leading gripper has a right-most home position close to a fixed position occupied by the retaining gripper 58. The retaining gripper first engages each tag when it has been drawn through the tag chute from the tag-thread sealing device. The leading gripper then takes over the tag to draw it to the left-most extended position. At that point, the required length of the thread has been drawn through the tag-thread attachment module for the next tag to be attached to the thread in that module. When the leading gripper has returned to the home position the cycle can therefore be repeated.

FIG. 4 shows further details of the movement of the leading gripper 56. When the leading gripper takes over a tag from the retaining gripper 58 it moves over a straight path 60a from its home position close to the retaining gripper, to the extended position which lies beyond the left-hand edge of the web. The movement to the extended position has brought the next tag over the right-hand edge of the web and the retaining gripper now closes to hold it fixed there. The leading gripper begins a return movement, also along the path 60a, that places the tag over the web, near its left-hand edge, where the tag is secured to the web as will be further described below. The gripper is then able to release the tag and is moved rearwards over the path 60b a short distance to allow it to continue its return movement across the web, along a path 60c parallel to its rectilinear path over the web. Finally it makes a short forward movement over path 60d bringing it to its home or starting position where the succeeding tag is held by the retaining gripper. The leading gripper can now take that tag over from the retaining gripper to repeat the cycle of movement.

The opening and closing movements of the jaws of the leading and retaining grippers 56,58 and the movements of the leading gripper 56 over the filter web, are generated by a series of cams on a common cam shaft 62 shown only fragmentarily. Also, although not illustrated, the motions of the mechanisms in the tag-thread attachment module can be produced by further cams on the same cam shaft or a further cam shaft rotating in synchronism with the cam shaft 62. Two cams on the cam shaft control the movement of the leading gripper 56 in the directions transverse to the web and longitudinally of the web respectively. As seen in FIG. 6, a cam 64 for the longitudinal movement acts on a follower lever 66 spring-loaded against the cam. The lever 66 moves about a fixed lower pivot 68. The upper end of the lever is connected by a link 70 to a table 72 supported in fixed guides 74 extending in the longitudinal direction of the web. The gripper 56 is mounted on a carriage 76 held in a linear guide 78 extending along an edge of the table 72, transversely to the web, so that the gripper 56 and table 72 reciprocate together in the longitudinal direction under the action of the first cam 64.

For the movement of the gripper carriage along its guide transverse to the web, as shown in FIG. 7, a second cam 82 acts on a horizontal lever 84 having a rear fixed pivot 86. The forward end of the lever 84 is connected by a link 88 to a bell crank lever 90 having a pivot axis 92 extending in the longitudinal direction of the web. A biasing spring 94 acting on the bell crank lever 90 urges the follower lever 84 against the cam. The upper arm of the bell crank lever 90 is connected to the gripper carriage 76 by a drive rod 96. Although not illustrated, the drive rod 96 is jointed to allow the gripper carriage 70 to accommodate the movements with the table 72 in the longitudinal direction generated by the first cam 64. The gripper jaws are operated by a further drive rod (not shown) which is similarly jointed and operated by another cam (not shown) on the cam shaft 62.

As already mentioned, the tag is secured to the web after it has been returned from the extended position to lie over the web. Referring to FIGS. 8 and 9, two ultrasonic sealing devices 102,104 each comprising a sealing horn 106 and anvil 108, secure the tag and its thread at locations close to the respective side edges of the web W. The horns 106 and the anvils 108 each have their own drive mechanisms (not shown) operated by further cams on the cam shaft 62. Adjacent the right-hand sealing device 104 and operating in synchronism with that device are a supplementary thread clamp 110 having upper and lower jaws 112,114 fixed relative to the sealing device horn 106 and anvil 108 respectively. Also mounted on the right-hand sealing device horn 106 is a thread cutting blade 114. The thread cutting blade 116 cooperates with a fixed counter-plate 118 which lies over the right-hand margin of the web.

The operations of the sealing devices 102,104 and the retaining gripper 58 are coordinated with the movements of the leading gripper 56 in the following manner by the cams on the cam shaft 62. As the leading gripper draws a tag and its thread across the web, the sealing devices 102,104 and the retainer gripper 58 are held open. As the leading gripper 56 reaches its extended position, with the thread drawn taut, the retaining gripper 58 is closed. The right-hand sealing device 102 has already begun to close; its horn 106 and anvil 108 remain apart at this point, but the adjacent thread clamp 110, which is spring loaded, grips the thread and web so that the length of thread under the cutting blade 116 is kept in the taut state unaffected by the return movement of the leading gripper and tag which now begins, as also does the closing movement of the left-hand sealing device 102.

As the tag is brought into the zone of left-hand sealing device 102, the horn 106 and anvil 108 of the device close to clamp the tag and the leading gripper 56 opens. Meanwhile the right-hand sealing device 104 has already closed and, in the final stage of its movement, the cutter blade 116 has severed the thread and has come to rest in a slot 122 in the counter-plate 118. The energisation of the ultrasonic sealing horns 106 after each sealing device 102,104 has closed secures the thread permanently to the web near its left-hand edge and attaches the tag releasably to the web near its left-hand edge, as indicated by the sealing zones 124a,124b in FIG. 8.

As it releases its tag, the leading gripper 52 is retracted rearwards, to follow its return path clear of the adjacent sealing device as the sealing operation proceeds. The right-hand sealing device 104 begins to open before the gripper 56 comes abreast of the device but the left-hand device 102 is opened only as the gripper 56 completes its return movement to the home position. Initiating the next cycle of movement, the leading gripper 56 now closes on the succeeding tag which is thereupon released by the retaining gripper 58.

With the opening of the sealing devices 102,104 the filter web can be stepped forward, and the cycle is then repeated. During the sealing of the tag and thread to the web, as already described, a further tag has been attached to the thread and severed from the tag strip at the attachment module 24 while the foremost tag-thread assembly was being secured to the web. This further tag, with its attached thread is then drawn along the tag chute with the movement of the next tag across the web.

The web W, with the tag-thread assemblies attached to it, is led to the inner bag unit C where the filled packets are produced by a form-fill process. As the flat web is drawn downwards in stepped movements through the inner bag unit by rollers 142,144 (FIG. 10), it is shaped over a guide 146 and around a forming tube 148 to bring the opposite side edges together progressively and those edges are then joined by an ultrasonic sealing device 150 to give the web a closed tubular cross-section with the tag-thread assemblies on its outer face before it leaves the forming tube. As will be understood, the stepped drive of the rollers 142,144 is synchronised with the rotation of the cam shaft 62.

Below the forming tube a transverse sealing mechanism 152 makes transverse seals across the tube at regular intervals and separates the individual packets formed by each successive pair of seals. In sequence with the transverse sealing of the tubular web, the dosing unit B dispenses doses of tea or other filling material through the forming tube 148, so that each packet receives a dose of material before it is sealed closed. In the illustrated example, successive transverse seals are rotationally offset at 90ÿ to each other about the axis of the forming tube and tubular web, so giving the packets a tetrahedral-like shape.

The dosing unit B can be of conventional form. Similarly, the means for giving the web its closed tubular form, need not be described in further detail. FIGS. 11 and 12, however, illustrate features of the transverse sealing and cutting mechanism 152.

The mechanism comprises a ring-form base plate 154 on which parallel guides 156 are secured to mount a pair of clamping jaws 158a,158b. A pair of air cylinders 160 are secured to opposite ends of a first of the jaws 158a, between the jaw and fixed brackets 162 on the base plate 154. A sprocket wheel 164 is mounted on each bracket and for each sprocket there is a chain (not shown) secured at one end to the first jaw 158a, and passing around 180ÿ of the sprocket to a return length that is secured to the second jaw 158b. The two jaws are thereby coupled together, so that the operation of the air cylinders 160 moves both jaws equal and opposite distances.

The mechanism 152 is provided with an ultrasonic sealing device comprising a horn 170 extending through an elongate slot 172 the first jaw and a cooperating anvil 174 provided by the opposed face of the second jaw. The horn 170 is coupled to a yoke 176 which is supported on a pair of guide tubes 178 extending between the brackets 162. A pistonless cylinder 180, also secured between the brackets 162 has a drive collar 182 coupled to the yoke 176 to displace the horn along the slot in the jaw 158a. The sealing horn 170 is also connected to its jaw 158a to move with it and is coupled to the drive collar 182 through a sleeve 184 in which the horn is slidable to permit movement transverse to the cylinder 180. The second jaw 158b also has a slot 186 along its length, in the centre of the anvil face. Projecting through that slot is a pressure wheel 188 connected to the yoke 176 through a spring-loaded mounting 188 urging the wheel 188 towards the horn 170.

With the clamping jaws 158a,158b open, the horn 170 is withdrawn from the anvil 172 and the anvil wheel 188 projects slightly from the second jaw 158b. When the clamping jaws close, the horn comes close to the outer face of the anvil 172 and applies pressure to the wheel 188. In this state, when the sealing horn 170 is energised, movement of the horn 170 and wheel 188 along their slots in the clamping jaws by the operation of the cylinder 180, severs the web across its width and simultaneously seals the web across its width at each side of the line of severance.

The base plate 154 is mounted on a turntable 190 to be rotatable coaxially to the forming tube by a servo-motor 192 coupled to the turntable by a toothed belt 194, drive control means (not shown) actuating the turntable to make successive 90ÿ rotations in opposite directions in synchronism with the rotation of the cam shaft 62. A sensor 196 for the turntable 190 rotation provides a datum position for the servo-motor drive control means. Over-limit switches 198 are provided at positions beyond the normal angular movement of the turntable 190 to stop the turntable drive if tripped by a cam block 200 carried by the turntable. The required rotation of the turntable can thus be generated simply and economically.

The sequence of operation of the transverse cutting and sealing mechanism is shown graphically in FIG. 14 against a time base. The diagram in FIG. 11 shows at I the movement of the clamping jaws, at II movement of the sealing device along the jaw slots, at III to energisation of the sealing horn, at IV the rotation of the turntable, and at V the feed of the tubular web through the mechanism.

In the first stage, the cylinders 160 close the clamping jaws 158a,158b, as shown at a, together to flatten and clamp the cylindrical web between them in a region spaced from the tag-thread assemblies. The ultrasonic sealing horn 170 is then energised, as shown at b, and the cylinder 180 operated, as shown at c, to move the horn 170 and wheel 188 across the width of the web completing the sealing and separation of a packet and forming the bottom seal of the next packet to be produced. The clamping jaws are then opened, as shown at d. The turntable 154 can now be rotated through 90ÿ, as shown at e, while the web is advanced the length of a packet, as shown at f. The clamping jaws close again, as shown at g, which is followed by a return traverse movement of the sealing device, as shown at h, with energisation of the horn as shown at i, the next sealing and cutting operation. The jaws open again, as shown at j, and the rotation of the turntable is reversed, as shown at k, as the next web length is fed through the mechanism, as shown at l, after which the cycle can be repeated.

What is claimed is:

1. Apparatus for attaching a tag and a thread length to a web of filter material with one end of the thread length secured to the tag and the other end being secured to the web adjacent one side edge of the web and the tag being attached to the web adjacent the opposite side edge, comprising gripper means for drawing the tag, with said thread secured thereto, across the web from said one edge to an extended position beyond the opposite side edge before returning the tag to a final extended position over the web, and means for attaching the tag to the web in said final position, a displacement mechanism for said gripper means comprising a first linear guide on which the gripper means is slidable, and a second inner guide transverse to said first guide on which said first guide is slidable, said second guide being fixedly located in the apparatus, whereby the gripper means is movable in the mutually transverse directions of the guides, both transversely across the web to said extended and final positions and longitudinally of the web away from the tag-attaching means.

2. Apparatus according to claim 1 wherein said first linear guide extends transversely across the web and said second linear guide extends longitudinally of the web.

3. Apparatus according to claim 2 wherein a cam drive is provided to control said movements of the gripper means.

4. Apparatus according to claim 3 wherein respective cams are provided for the displacements of the gripper means and its guide in the mutually transverse directions.

5. Apparatus according to claim 1 wherein the tag attaching means comprises a sealing member and an opposed anvil between which the web and tag are clamped to be sealed together, a further sealing member and anvil being provided for attaching the thread adjacent said one side edge of the web, and respective drive means are provided for each sealing member and anvil for performing said attachment adjacent each side edge independently of the other.

6. Apparatus according to claim 5 wherein the attachment of the thread adjacent said one side edge is arranged to be completed before said attachment of the tag to the web.

7. Apparatus according to claim 6 comprising means between said sealing members and anvils but nearer said one side edge of the web for clamping the thread to the web when the thread has been drawn to said extended position and before the gripper means has returned to said final position.

8. Apparatus according to claim 1 comprising holding means for engagement with the thread beyond said thread length and adjacent said one edge of the web when the tag has been drawn to its extended position.

\* \* \* \* \*